United States Patent [19]
Shimomura

[11] Patent Number: 5,514,431
[45] Date of Patent: May 7, 1996

[54] AIR BAG AND METHOD FOR MAKING THE AIR BAG

[75] Inventor: Kyoichi Shimomura, Fukuoka, Japan

[73] Assignee: Dai Nippon Printing Co., Ltd., Tokyo, Japan

[21] Appl. No.: 176,124

[22] Filed: Dec. 30, 1993

[51] Int. Cl.⁶ .............. B32B 7/06; B32B 31/12; B32B 31/30
[52] U.S. Cl. .............. 428/35.3; 156/277; 156/289; 156/290; 156/244.11; 383/107; 427/250; 427/294; 428/35.2; 428/35.8; 446/224
[58] Field of Search .................. 156/277, 289, 156/290, 244.11, 244.16; 428/34.8, 35.8, 35.3, 35.7, 178, 195, 200, 187, 35.5; 383/3, 105, 107, 116; 446/224; 427/250, 294

[56] References Cited

U.S. PATENT DOCUMENTS

| | | | |
|---|---|---|---|
| 1,625,582 | 4/1927 | Anderson | 156/290 X |
| 3,051,605 | 8/1962 | Stannard | 156/290 X |
| 3,491,791 | 1/1970 | Polk | 156/290 X |
| 4,367,071 | 1/1983 | Mizuno et al. | 156/277 X |
| 4,490,420 | 12/1984 | Yoshida | 156/290 X |
| 5,248,275 | 9/1993 | McGrath et al. | 446/224 |

FOREIGN PATENT DOCUMENTS

| | | | |
|---|---|---|---|
| 61-79080 | 5/1986 | Japan | F16K 15/14 |
| 1-153829 | 6/1989 | Japan | F16F 9/04 |
| 3-117170 | 12/1991 | Japan | F16K 15/20 |
| 4-3974 | 1/1992 | Japan | B65P 81/10 |

*Primary Examiner*—Michael W. Ball
*Assistant Examiner*—Francis J. Lorin
*Attorney, Agent, or Firm*—Wenderoth, Lind & Ponack

[57] ABSTRACT

An air bag is made by bonding a pair of sheets to each other by heat-sealing with a releasing layer corresponding to a pattern of a number of cellular air chambers sandwiched therebetween. A check valve for air infusion, which is used for filling air in the air bag, is mounted in one of the air chambers. When air is infused into a space between either of a pair of sheets and the releasing layer through an air infusion port of the check valve, the releasing layer and the corresponding sheet are peeled from each other by the air pressure. As a result, the air chambers are formed between the two layers.

20 Claims, 12 Drawing Sheets

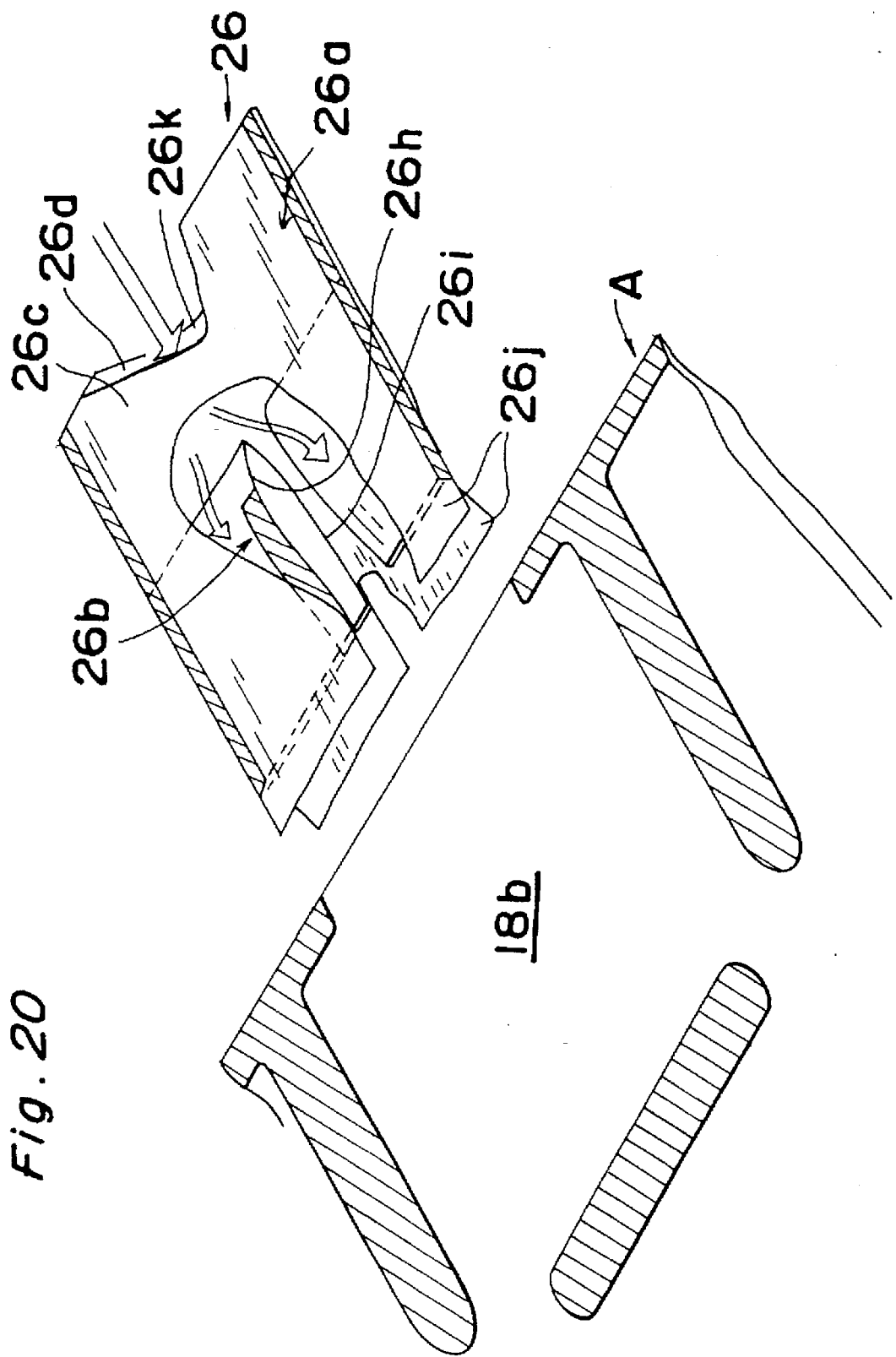

1

AIR BAG AND METHOD FOR MAKING THE AIR BAG

BACKGROUND OF THE INVENTION

1. Field of the Invention

The present invention generally relates to an air bag used for many applications such as a buffer, thermal insulation, a balloon, a cushion and also relates to a sheet, and its production method, and particularly relates to a simple air bag which is composed of resinous laminated film and has a multitude of air-chamber cells, and the production method thereof.

2. Description of the Related Art

Conventionally, air bags of the type described above, to be used as a buffer and the like, are manufactured by heat-sealing two heat-sealable sheets lapped one over the other. In its manufacturing process the heat-sealing is generally performed by a press mold formed of a heating rod. However, the conventional method has such problems such as: (1) because this air bags of the type include a large number of air chamber cells, the heating rod to be used is required to be formed in a complex shape, and such a complex shape cannot be minutely formed, and (2) due to the batch processing, the work inevitably has to be done intermittently, leading to poor production efficiency.

SUMMARY OF THE INVENTION

Accordingly, an essential object of the present invention is to solve the problems of the conventional art, i.e. to provide an air bag which can be easily and efficiently produced with easy formation of air chamber cells having sophisticated and fine patterns, and a method for manufacturing such an air bag.

Another object of the present invention is to provide the above air bag having a suitable air infusion valve.

In order to accomplish these and other objects, an air bag according to the present invention is formed by bonding together a first sheet and a second sheet sandwiching between them a releasing layer having a pattern corresponding to a desired air chamber pattern.

In the above construction, when air is introduced under pressure into a space between the first sheet and the releasing layer, due to the weak adhesive force therebetween, peeling occurs at the interface between them by the pneumatic pressure, and an air chamber is formed between the two layers. In other words, by supplying air into the gap between the two layers, the air bag having the air chamber formed corresponding to the above pattern is made.

In the above construction, it is preferable to construct the air bag in such a way that at least one of the first and second sheets includes a picture pattern print layer or a vacuum metallizing deposition layer. By this construction, the an bag having an excellent design and thermal insulation effects is made.

The above air bag may have a single air chamber, but generally, the air chamber comprises a large number of cellular air chambers communicating with one another. Also, the air bag is generally provided with an air infusion valve communicating with the above air chamber.

One of preferable valves used as the air infusion valve is a film valve. In using a film valve of this type, an opening communicating with the above air chamber is formed between the two sheets at a predetermined position of a peripheral part of the air bag, and the film valve is inserted into the opening. As a preferred embodiment, the film valve comprises a pair of films mutually bonded on both sides, and outer ends of the two films are respectively bonded to the first and second sheets at a peripheral part of the opening, while their inner ends are respectively kept released from the first and second sheets.

According to another preferred embodiment, the film valve is made up of a valve body comprising a pair of front and back films and a valve member formed by bending itself in a V-shape. On the other hand, between the two sheets, at a predetermined position of a peripheral part of the above air bag, an opening communicating with the above air chamber is formed. The valve member, with a bent portion thereof facing a side of an air infusion port of the valve, is held between the pair of films of the valve body, and both sides of the valve member are bonded to the two films of the valve body. Further, each tongue piece formed at the tip side of each of the two films is bonded to the surfaces of the first and second sheets at the opening of the air bag. In this case, it is preferable that a heat-sealable layer to which each tongue piece of the pair of front and back films of the film value is bonded is provided on each surface of the first and second sheets. With this arrangement, by a simple operation of fitting each tongue piece of the film valve to each of the surfaces of the first and second sheets and heating it the outside, the film valve can be fitted to the air bag body airtightly.

With respect to the above valve the infusion of air, it is also possible to use one, having a configuration frequently adopted for a tire for swimming, which comprises an air infusion port communicating with the above air chamber and projecting outside from the air chamber, and a plug for opening and closing the air infusion port.

As an air infusion system, there may be adopted a system where, at a predetermined position of a peripheral part of the air bag, an air infusion port is formed between the first and second sheets. The air chamber and the air infusion port are communicated by a narrow, meandering air infusion passage filled with viscous liquid.

Further, as another valve for air infusion, there may be adopted a button-type valve which is provided by thrusting through the pair of sheets at a location of a cellular air chamber of the above air chamber. This button-type valve, which is a check valve having an air infusion port is constructed such that air infused from the air infusion port is infused into the above cellular air chamber of the air chamber. A pair of upper and lower flanges of the valve positioned outside the above sheets are airtightly bonded to the surfaces of the above sheets.

According to a preferred embodiment of the above button-type valve, it comprises a valve body having a flanged bottom wall and a cylindrical leg which penetrates the sheets. A flange-type cap fitted to at least one end of the leg and has the air infusion port. A disk-shaped elastic valve member is sandwiched between the cap and a valve seat at a top of the leg of the valve body. The leg of the valve body has an axial groove on top of the valve seat, and the air infused from the air infusion port of the cap is led to the cellular air chamber through the groove when the elastic valve member is pushed down the groove by the air.

According to another preferred embodiment of the above button-type valve, it comprises a valve body having a flanged bottom wall with an air infusion port and a cylindrical leg which penetrates the sheets, a flange-type cap fitted to at least one end of the leg and having an air infusion port, a seat member housed in the leg, and a disk-shaped elastic valve members sandwiched between the cap and a valve seat at an upper top of the seat member and between the bottom wall and a valve seat at a lower top of the seat member. The seat member has notched air passages at the upper and lower tops thereof, so that the air infused from the air infusion port of the cap or from the air infusion port of the bottom wall of the valve body is led to the cellular air chamber through the groove when each elastic valve member is pushed down each air passage by the air.

Further, according to the present invention, there is provided a production method suitable for producing the air bag with the above construction.

That is, the production method comprises the steps of printing a releasing layer having a pattern corresponding to a desired air chamber pattern on an inner surface of either a first sheet or a second sheet, and bonding the first and second sheets to each other with the releasing layer being sandwiched therebetween.

By adopting the above method, the releasing layer having the pattern corresponding to the desired air chamber pattern can be continuously, freely, and easily formed, so that the production efficiency can be greatly improved.

In the above production method, the second sheet is preferably bonded to the first sheet by a heat fusion extrusion laminate method. According to this method, no special bonding step is necessary, and only by laminating the second sheet by the heat fusion extrusion laminate method, the second sheet is automatically and continuously bonded to the first sheet in the whole region where no releasing layer exists.

As another preferred embodiment of the above production method, there is a method for forming heat-sealing bonding layers on the inner surfaces of the above first and second sheets, respectively, and bonding the first and second sheets to each other by heating under pressure at the above bonding step. According to the method, the first and second sheets are led through a pair of heating rolls, thereby making it possible to bond the two sheets to each other continuously.

BRIEF DESCRIPTION OF THE DRAWINGS

The above objects and features of the present invention will become apparent from the detailed description of the preferred embodiments of the present invention with reference to the accompanying drawings in which:

FIG. 20 is a perspective exploded view of FIG. 19; and

DETAILED DESCRIPTION OF THE INVENTION

A first embodiment will be explained with reference to FIGS. 1 to 6.

Figure 1:
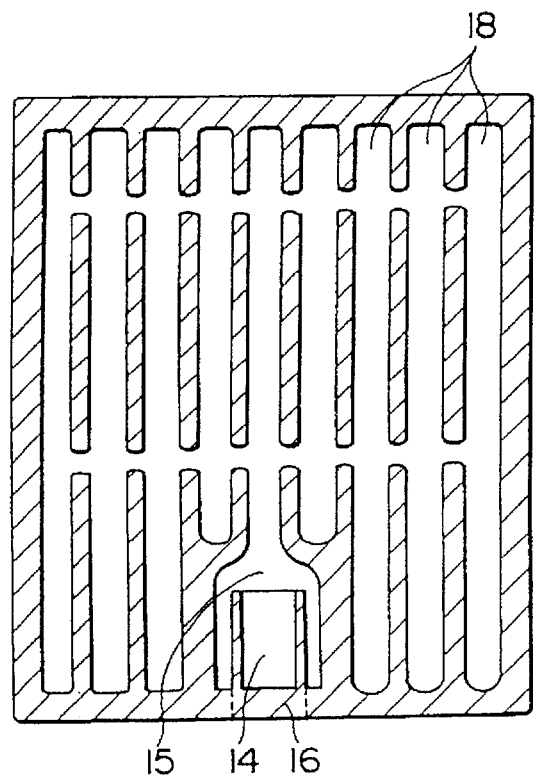
FIG. 1 is a whole plan view of an air bag according to a first embodiment of the present invention.
Figure 2:
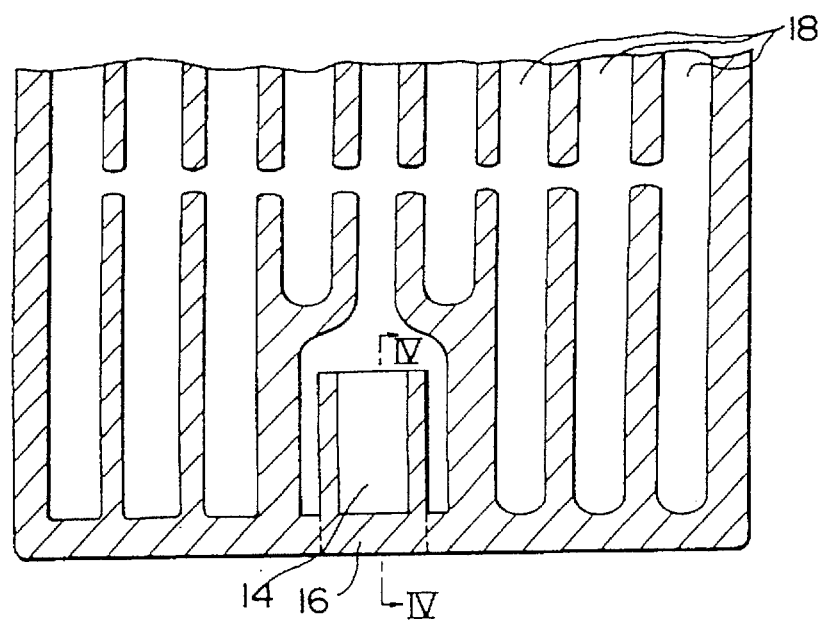
FIG. 2 is an enlarged partial view of the air bag shown in FIG. 1.
Figure 3:
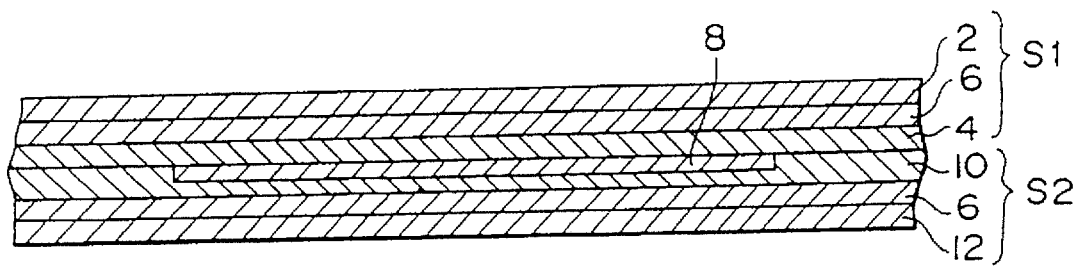
FIG. 3 is an enlarged sectional view of an essential part of the air bag shown in FIG. 2.
Figure 4:
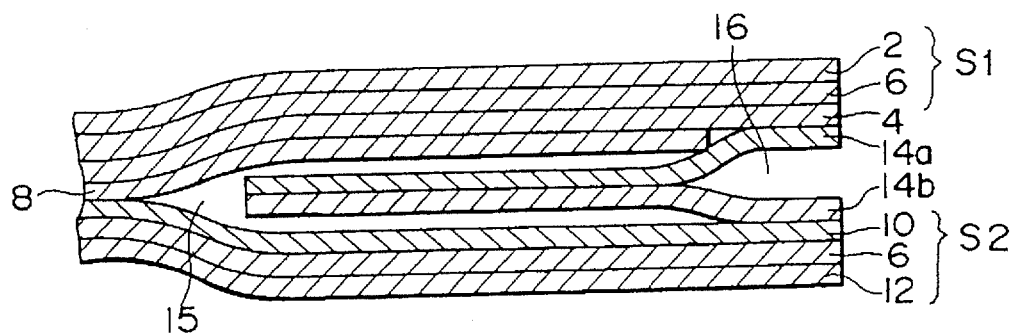
FIG. 4 is an enlarged sectional view taken along the line IV—IV in FIG. 2.
Figure 5:
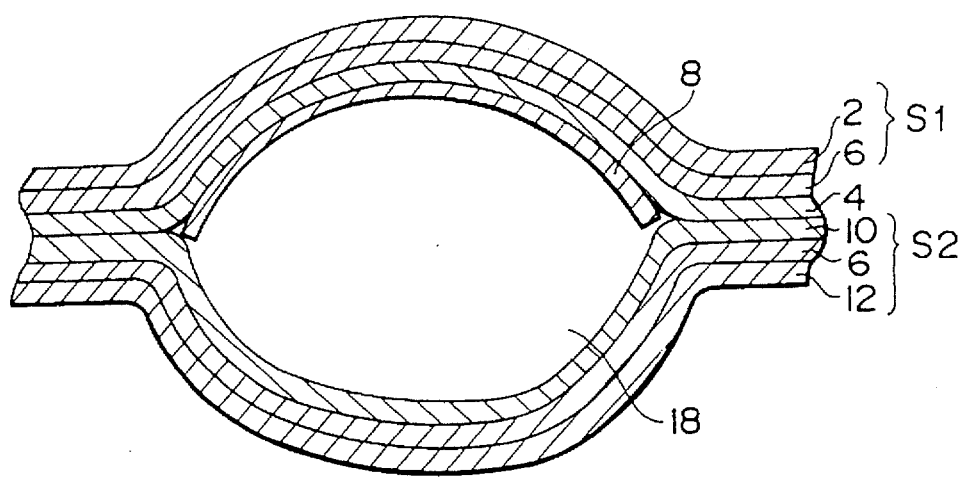
FIG. 5 is a view showing a state in which air is filled in the air bag of FIG. 3.

FIGS. 1 and 2 are a whole plan view and a partially enlarged view of an air bag, respectively, according to this embodiment, and FIGS. 3 to 5 show sections of essential parts of the air bag shown in FIGS. 1 and 2, respectively. Further, FIG. 6 shows lamination steps in order for making the air bag.

As shown in FIG. 3, the air bag has a construction made by laminating, in order, a first base film 2, an anchor coat layer 6, a first bonding layer 4 made preferably of polyethylene resin, a releasing layer 8, a second bonding layer 10 made preferably of polyethylene resin, an anchor coat layer 6, and a second base film 12. Now, regarding the releasing layer 8 as a border, the part of the whole layers above the border is named a first sheet S1 and the part of the whole layers below the border is named a second sheet S2. Accordingly, this air bag is made by bonding the first sheet S1 and the second sheet S2 with the releasing layer 8 sandwiched therebetween. In FIGS. 1 and 2, a reference numeral 18 shows the air chamber provided in the air bag. The above releasing layer 8, having a pattern conforming to any desired air chamber pattern, is laminated on the first bonding layer 4. As shown in the figure, this air chamber 18 is composed of a plurality of longitudinal cells which are connected to each other, and in conformity with the pattern, the releasing layer 8 is formed continuously between the first and second bonding layers 4 and 10. On the other hand, in FIGS. 1 and 2, numerals 15 and 16, respectively, show an air infusion passage provided for sending air into the abovementioned air bag 18 and an infusion port thereof. A numeral 14 shows a film valve provided in the infusion port 16, i.e. a kind of a check valve formed by laminating a plurality of films. As shown in FIG. 4, the film valve 14 according to this embodiment is composed of a pair of films 14a and 14b, and both sides of the films 14a and 14b are bonded to each other, while two ends thereof, i.e. the outer end, and the inner end are left open. The outer end parts of both films are, respectively, bonded to the first bonding layer 4, after removal of the releasing layer 8, and the second bonding layer 10, at the location of the air infusion port. On the other hand, the other ends of the film 14a and 14b, i.e. the inner end parts, are left open without being bonded to each other. However, the inner ends are mutually in tight contact so that the film valve 14 is constructed to function as a check valve that allows air to be sent only in one direction, from the infusion port 16 of the air infusion passage 15. In other words, in FIG. 4, when air is sent in, the two ends of the films 14a and 14b are readily opened to make air flow possible, but because the two films 14a and 14b come into tight contact with each, other air leakage is prevented. In FIGS. 1 and 2, the hatched portions show the portions where the first bonding layer 4 and the second bonding layer 10 are bonded to each other without the releasing layer 8 between them.

When air is forced through the film valve 14 under pressure, the air is guided into the air infusion passage 15. And, as shown in FIG. 3, as the releasing layer 8 and the second bonding layer 10 are weakly bonded to each other, they are readily peeled from each other at their interface by the pneumatic pressure, and the air chamber 18 formed between the two layers 8 and 10 is filled up with air, as shown in FIG. 5. By continuing to force air in under pressure, the peeling of the two layers 8 and 10 spreads over the whole air bag.

Figure 6A:
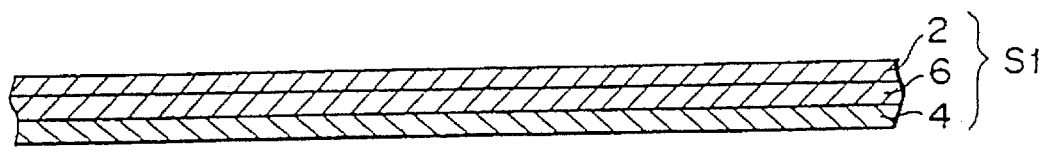
FIGS. 6 (I), (II) and (III) are enlarged sectional views of an essential part of the air bag shown in FIG. 1, illustrating manufacturing steps thereof.
Figure 6B:
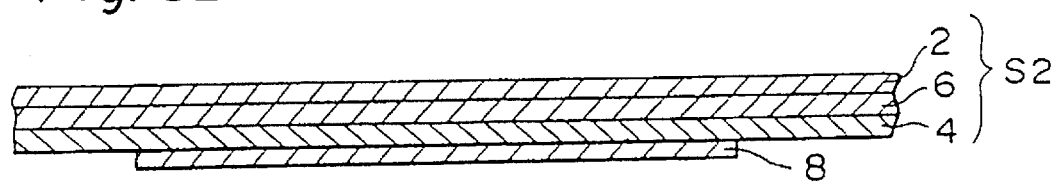
Figure 6C:
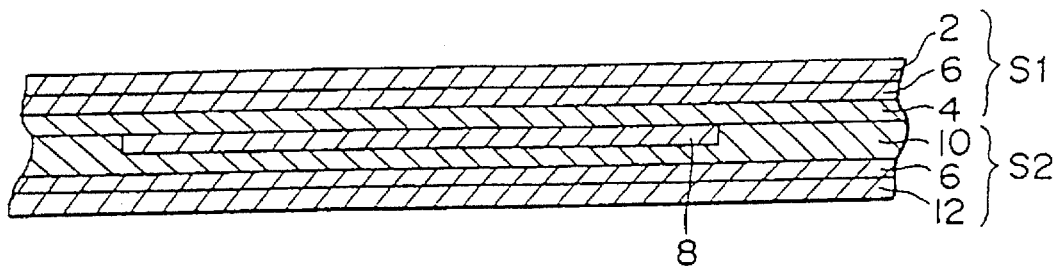

Next, the method for producing a air bag having the abovementioned constitution is explained in accordance with FIG. 6.

First, as shown in FIG. 6 (I), on the first base film 2 having a film thickness of, for example, 7–25 μm, an anchor coat layer 6 is formed by extruding a lamination of polyethylene, and then a polyethylene resin layer, i.e. the first bonding layer 4, is formed on the anchor coat layer in a thickness of, for example, 15–50 μm.

Next, as shown in FIG. 6 (II), on the first bonding layer 4, the releasing layer 8 having a continuous pattern corresponding to the above mentioned desired pattern of the air chamber is formed by gravure printing or flexographic printing, or the like.

Next, as shown in FIG. 6 (III), on the whole surface of the first bonding layer 4 on which the above releasing layer 8 is formed, a second bonding layer 10 made of a material of the same kind as that of the first bonding layer 4, i.e. a polyethylene resin, is formed in a thickness of, for example, 15–50 μm. The second base film 12, of 7–25 μm, made of the same kind of material as that of the first base film 2, is provided with the anchor coat layer 6 and laminated on the second bonding layer 10.

Next, as shown in FIGS. 1 and 2, at a predetermined position on the periphery of the air bag body, the second bonding layer 10 and the releasing layer 8 are peeled from each other at a part of the interface in which they are weakly bonded to each other in order to make an opening. Next, the film valves 14a, 14b are inserted into the opening between the two layers 10 and 8, and, in order to make it possible to achieve sealing between one of the film valves 14a and the first bonding layer 4, a part of the releasing layer 8 is either peeled off forcibly by applying an adhesive tape to the releasing layer under pressure or removed by it off with a solvent. The outer ends of the film valves 14a and 14b are bonded to the first bonding layer 4 and the second bonding layer 10, respectively, as shown in the figure, by which the desired air bag is formed.

By performing the operation of filling air into the air bag from the air infusion port 16 as above, an air bag filled with air is made. When the air bag is cut by a predetermined unit length while being subjected to heat sealing, a large number of air bags are obtainable after a single air filling operation.

Formation of the releasing layer 8 is suitably performed, as described above, by gravure printing or flexographic printing. When the pattern is fine, gravure printing which excels in precision printing is preferred. Using the gravure printing, the size of the width of the air chamber, and the size of the space between the adjacent air chambers, can be reduced to a minimum of 0.5 mm.

Further, the releasing layer 8 may be colored. The colored layer has advantages, such as the design property of the air bag being improved and facilitating confirmation of the configuration of the pattern in printing.

As materials for forming the abovementioned films, sheets and layers 2, 4, 6, 8, 10 and 12, the followings are desirable. As materials for forming the first and second base films 2 and 12, for example, polyester, stretched nylon, unstretched nylon, polyester or stretched nylon coated with polyvinylidene chloride, or, polyester or stretched nylon or stretched polypropylene or the like provided with aluminum vacuum metallizing deposition is preferably used. Suitable examples of materials for the first and second bonding layers 4 and 10 are low density polyethylene, linear low density polyethylene, ethylene-vinyl acetate copolymer, surlyn, ethylene-methacrylic acid copolymer, unstretched polypropylene, etc. As for materials for the anchor coat layer 6, for example, urethane resin, titanium resin, imine resin, isocyanate resin, or the like is preferably used. As materials for the releasing layer 8, for example, any varnish formed of a single composition of polyamide resin, cellulose resin, urethane resin, cyclic rubber resin, chlorinated polypropylene resin or the like, or, any varnish formed by mixing more than two types of varnishes each of which is formed of the abovementioned single composition is preferably used. This releasing layer 8 can be pigmented to any desired color by mixing pigment into any one of the abovementioned varnishes. Suitable examples of materials for the film valve are soft films formed of polyethylene, ethylene-vinyl acetate copolymer.

Next, a second embodiment will be explained with reference to FIGS. 7 to 10.

Figure 7:
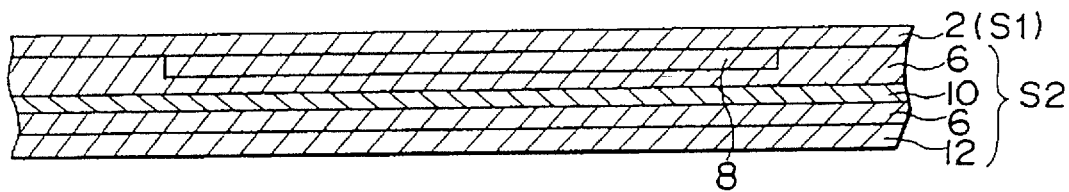
FIG. 7 is an enlarged sectional view of an essential part of an air bag according to a second embodiment of the present invention.
Figure 8:
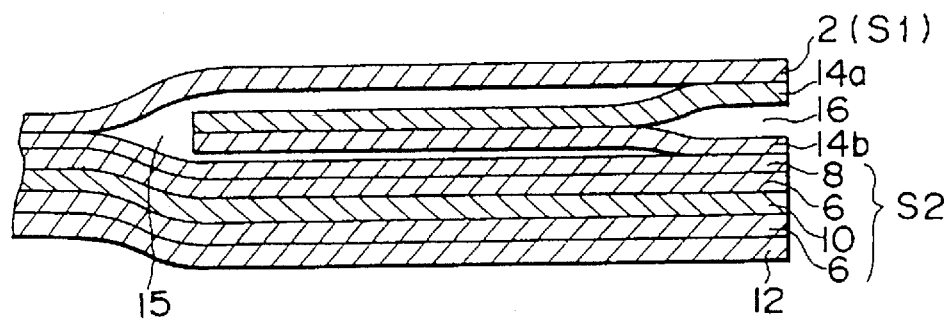
FIG. 8 is a sectional view of an essential part of the air bag of FIG. 7 of the present invention, provided with an air infusion valve.
Figure 9:
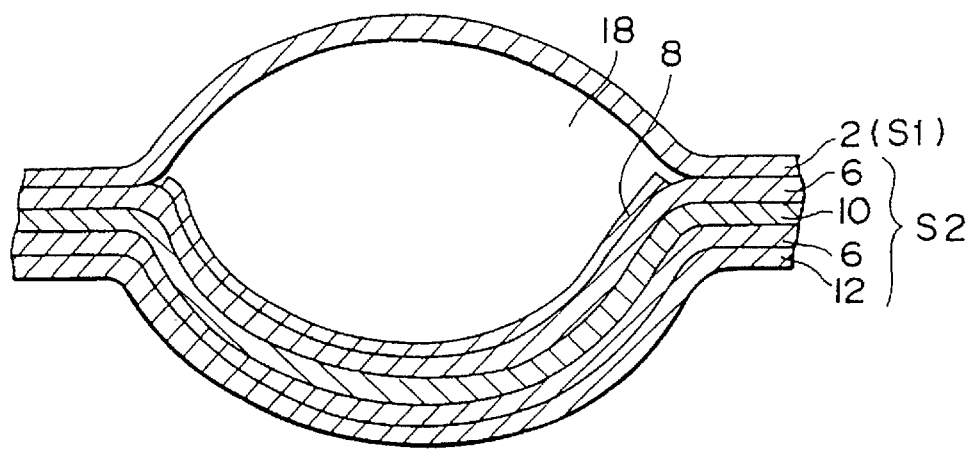
FIG. 9 is a view of the air bag of FIG. 7 showing a state in which it is filled with air.

FIGS. 7 to 9 show, respectively, the sections of the essential parts similar to those shown in FIGS. 3 to 5, and FIG. 10 shows lamination steps in order for making the air bag of the present invention.

The air bag according to this embodiment has the same basic constitution as that of the air bag of the first embodiment mentioned above, but the first bonding layer 4 is omitted, and the releasing layer 8 is directly laminated on the first base film 2. The position to mount the film valve 14 is changed, thereby making the peeling position between layers different from that of the first embodiment. In other words, as shown in FIG. 7, this air bag has a construction formed by laminating a first base film 2, a releasing layer 8, an anchor coat layer 6, a second bonding layer 10, an anchor coating layer 6, and a second base film 12, in this order. Consequently, according to this embodiment, regarding the releasing layer 8 as a border, the part above it constitutes a first sheet S1, and the part below it a second sheet S2.

On the other hand, with respect to the position to mount the film valve 14, as shown in FIG. 8, an end part of each film 14a. 14b is bonded to the first base film 2 and the releasing layer 8, respectively. Alternatively, a part of the releasing layer 8 may be removed so as to have one end of the one film valve 14b directly bonded to the anchor coat layer 6.

When air is forced in, under pressure, through the air infusion port 16 having a film valve 14, the film valve 14 is opened and air is introduced into an air infusion passage 15. And, by the pneumatic pressure thereof, the first base film 2 and the releasing layer 8, which are weakly bonded to each other as shown in FIG. 7, are peeled from each other at their interface, thus forming an air chamber 18 between the two layers 2 and 8 as shown in FIG. 9. By continuing to force air in under pressure, the peeling of the two layers 2 and 8 spreads over the whole air bag.

Figure 10A:
FIGS. 10 (I), (II) and (III) are enlarged sectional views of an essential part of the air bag shown in FIG. 7, illustrating manufacturing steps thereof.
Figure 10B:
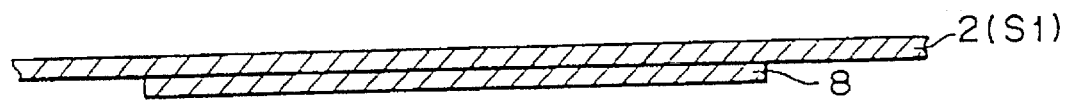
Figure 10C:
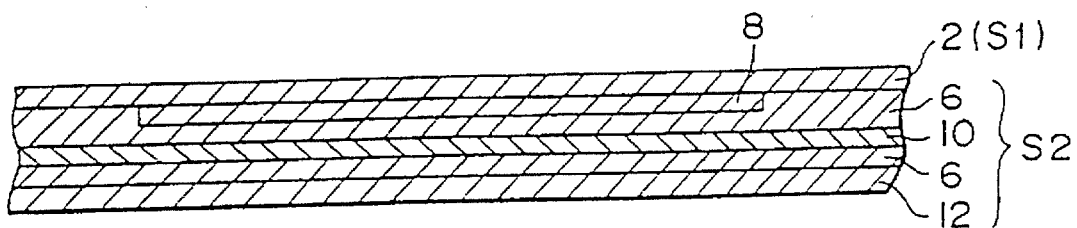

Next, the method for producing the air bag having the above construction is described according to FIGS. 10.

First, as shown in FIGS. (I) and (II), the releasing layer 8 is formed on the first base film 2 by gravure printing, flexographic printing or the like.

Next, as shown in FIG. 10 (III), after the anchor coat layer 6 is coated on the whole surface of the first base film 2 on which the releasing layer 8 is formed, the second bonding layer 10, made of the same kind of material as that of the first bonding layer, is formed on the anchor coat layer 6 by extruding polyethylene. And, simultaneously, on the second polyethylene resin layer 10, the second base film 12 having the anchor coat layer 6 is laminated.

Next, in a predetermined position of a peripheral part of the air bag body according to this embodiment, the film valves 14a and 14b are inserted into the opening between the first base film 2 and the releasing layer 8. Then the outer ends of the films 14a and 14b are bonded to the first base film 2 and the releasing layer 8, respectively, as shown in FIG. 8. By this step, the air bag is formed.

Next, this laminated body is filled with air in the same manner as in the first embodiment. If necessary, the body is cut while being heat-sealed in order to make a large number of air bags. The material and size of each layer constituting the air bag according to this second embodiment is the same as the material and size of each layer constituting the air bag according to the first embodiment.

As an example of modification of the abovementioned method, it is also possible to prepare, in advance, both the first and second sheets $S_1$ and $S_2$, whose bonding layers 4 and 10 are formed of a heat-sealable material (thermoplastic resin), by employing a heat fusion extrusion laminate method, and then to put the first and second sheets together under pressure with a pair of heating rollers.

Figure 7A:
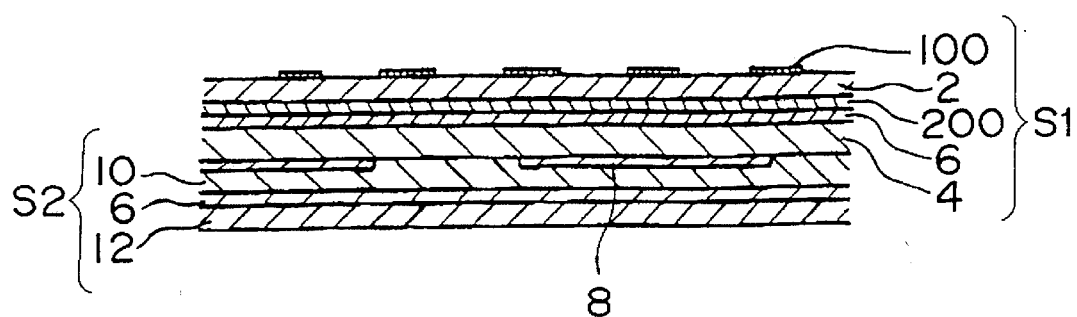
FIGS. 7A and 7B are enlarged sectional views of essential parts according to modifications of FIG. 7, respectively.
Figure 7B:
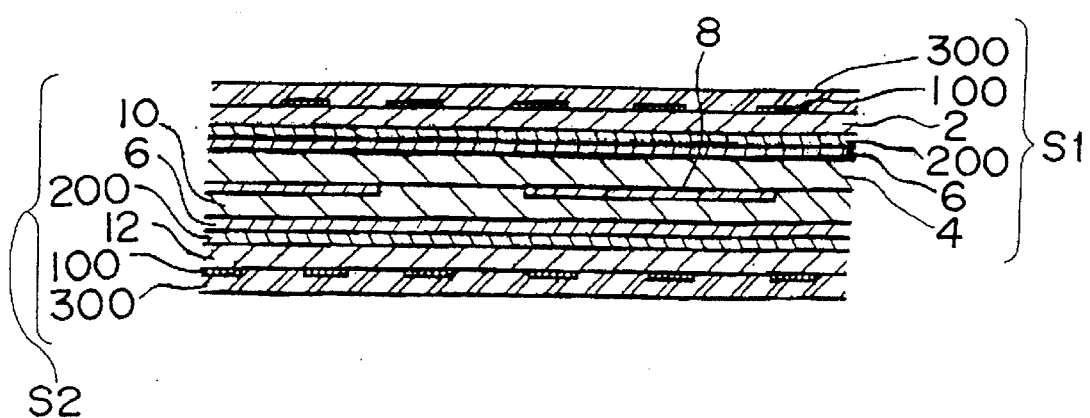

FIGS. 7A and 7B show, respectively, a modifications of lamination structures of the sheets S1 and S2. FIG. 7A is characterized in that a picture pattern layer 100 is printed on the surface of the base film 2 of the first sheet S1, and that a vacuum metallizing deposition layer 200 is laminated between the base film layer 2 and the anchor coat layer 6. Preferably the picture pattern layer 100 and the vacuum metallizing deposition layer 200 are formed on the outer and inner surfaces of the base film 2, respectively, in advance.

The picture pattern layer 100 and the vacuum metallizing deposition layer 200 may be provided on the second sheet, as shown in FIG. 7B, in entirely the same manner as in the case of the first sheet. Further, on the surfaces of the sheets S1 and S2, i.e. on each of the picture pattern layers 100, a heat sealable bonding layer 300 may be formed. In this case, as the base films 2 and 12 are, respectively, sandwiched between the heat sealable bonding layers 300 and the first and second bonding layers 4 and 10, even if it undergoes any crease or bend, the occurrence of pinholes in each base film 2 and 12 can be effectively prevented.

As described above, by forming a picture pattern layer 100, a design decoration effect can be improved. Also, by forming a vacuum metallizing deposition layer 200, a heat insulation effect can be provided. The product is, accordingly, most suitable for use for cushion sheets and the like.

FIGS. 11 to 21 show modified embodiments of the valve or the air infusion passage used for the air bags according to the first and second embodiments and the abovementioned modified embodiments.

Figure 11:
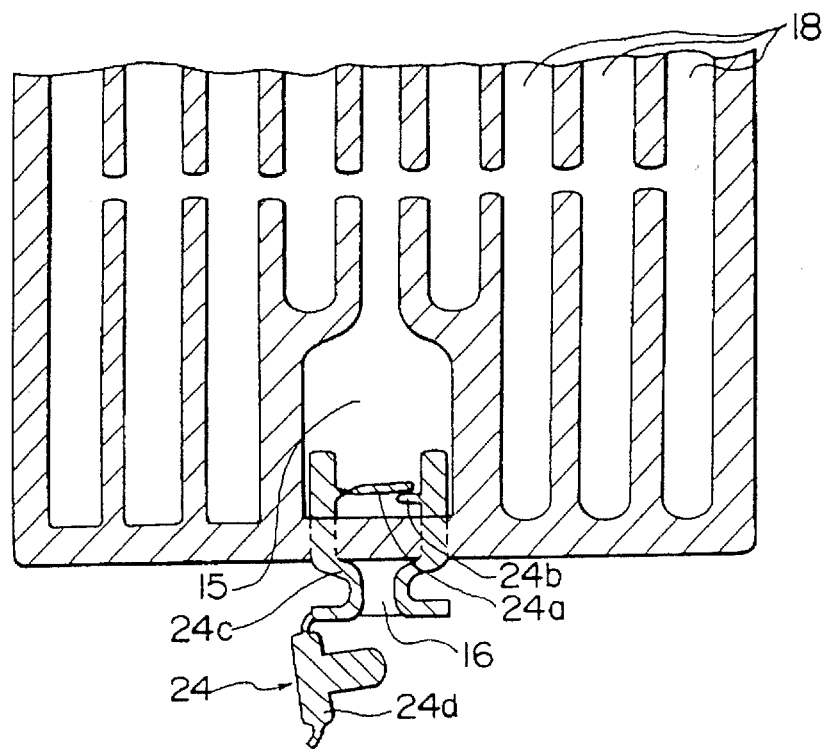
FIG. 11 is an explanatory view showing a state in which a modified embodiment of the air infusion valve is applied to the air bag body according to the first or second embodiment of the present invention.

In FIG. 11, a reference numeral 24 shows a conventional type of valve used for a tire for swimming and the like. As shown in the figure, the valve 24 has a cylindrical valve body 24c, a valve seat 24b provided on the inner surface of the valve body 24c, a check valve 24a which is rotatably provided on the inner surface of the valve body 24c and which is designed to work with the valve seat 24b, and a plug 24d which can be fitted in the inner surface of the air infusion port 16 of the valve body 24c.

This valve can be used instead of the film valves 14a and 14b, according to the first and second embodiments and the abovementioned modified embodiments, by mounting at the same location as the film valves 14a and 14b.

Figure 12:
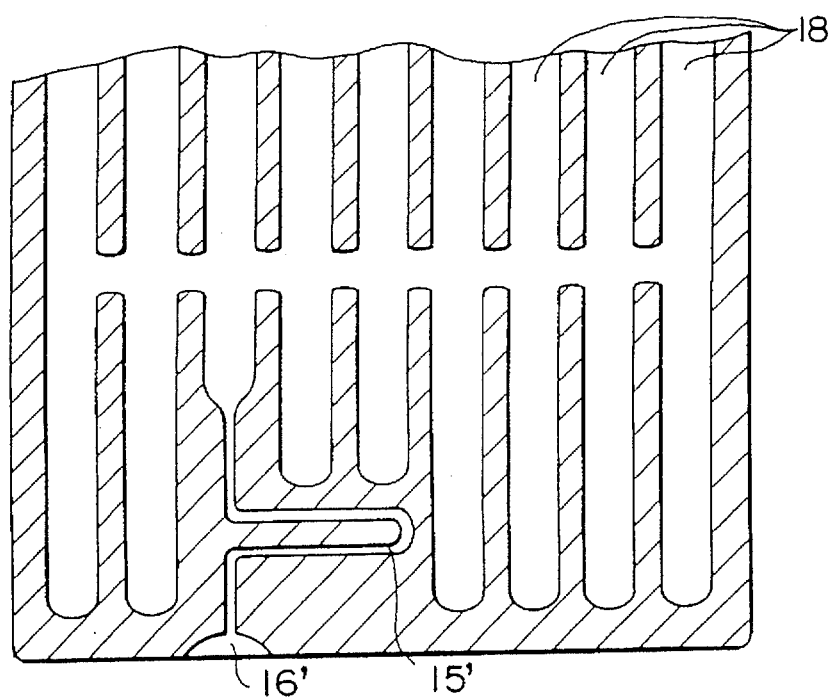
FIG. 12 is an explanatory view showing a state in which a modified embodiment of the air infusion passage is applied to the air bag according to the first or second embodiment of the present invention.

On the other hand, in FIG. 12, numerals 16' and 15', respectively, show an air infusion port and air infusion passage. As shown in the figure, by forming the air infusion passage 15' in a longitudinal meandering form, the passage is provided with the function of a check valve so that the air filled in the air chamber 18 through the air infusion passage 15' from the air infusion port 16' does not flow reversely. It is to be noted that in this modification that the reverse flow of air, as mentioned above, after the infusion of air, can be more effectively prevented by filling a viscous liquid material such as silicon in the air infusion passage 15' in advance, before the infusion of air.

Figure 13:
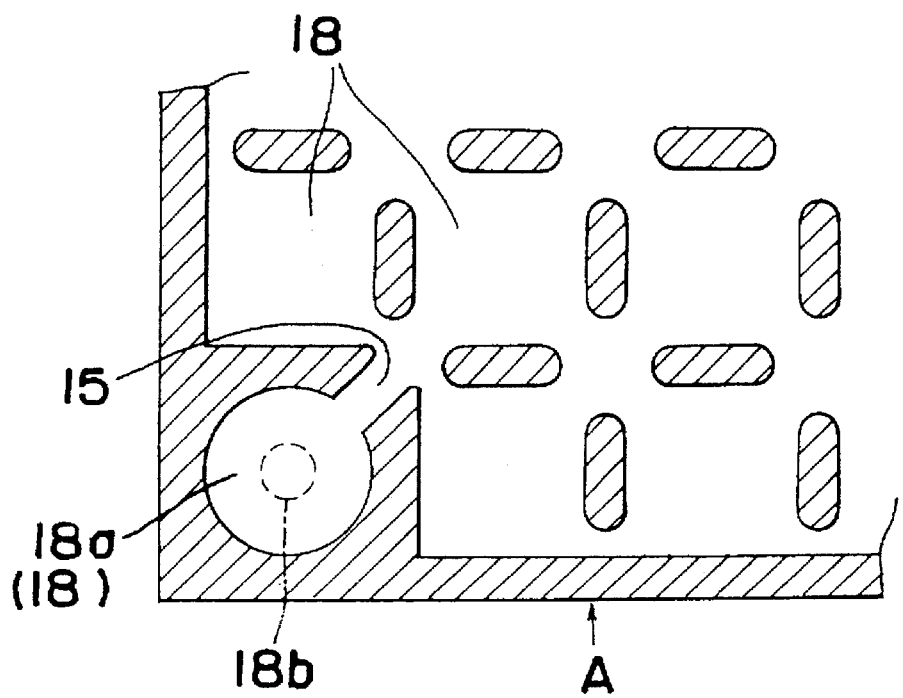
FIG. 13 is an enlarged plan view of an essential part of an air bag body to which another air infusion valve is applied.

FIGS. 13 to 16 show another air infusion valve. This is a button-shaped valve 25, which is not of the type to be mounted by opening the periphery of the air bag body as in the foregoing embodiment, but of the type to be directly mounted in one of the desired air chambers 18 of an air bag body A. In this embodiment, a special shaped air chamber 18a, i.e. an air infusion chamber 18a, is formed on a corner of a body A. This air chamber has a circular shape in planar view, and is communicated with other air chambers 18 through an air infusion passage 15. In FIG. 13, a reference numeral 18b shows an opening to be provided at a central part of the air chamber 18a to mount the valve 25.

Figure 14:
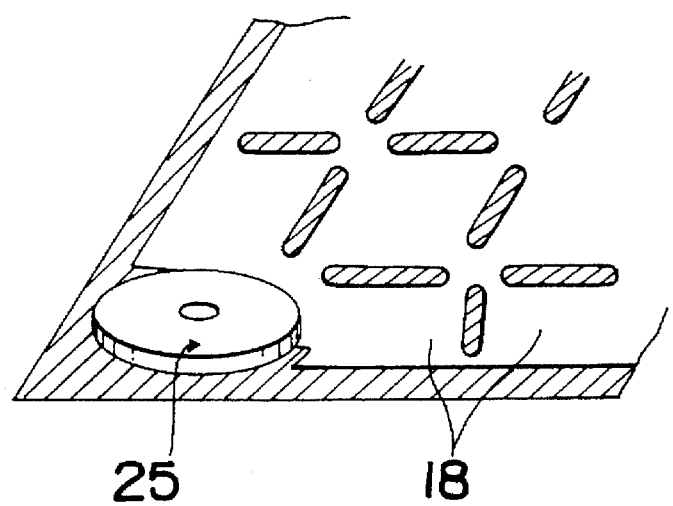
FIG. 14 is an enlarged perspective view of an essential part showing a state in which a button-type valve is applied to the air bag body of FIG. 13.
Figure 15:
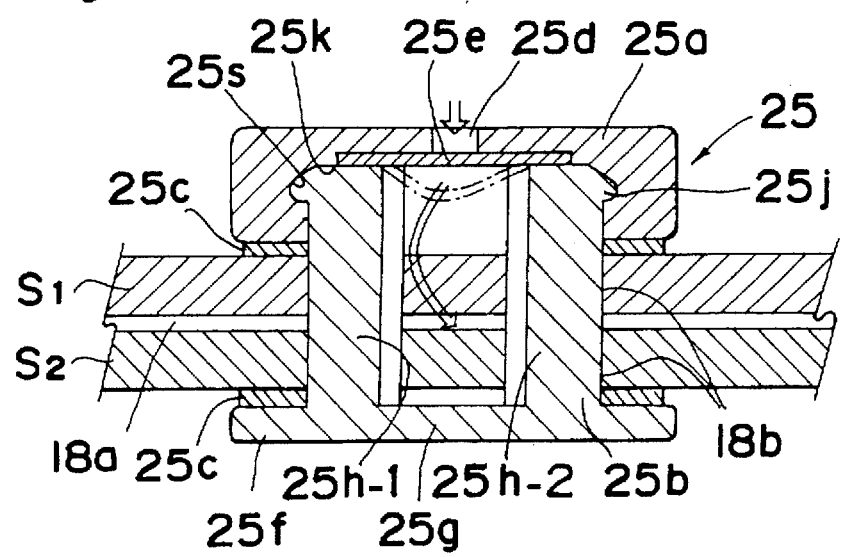
FIG. 15 is an enlarged sectional view of a place where the button-type valve of FIG. 14 is provided.
Figure 16:
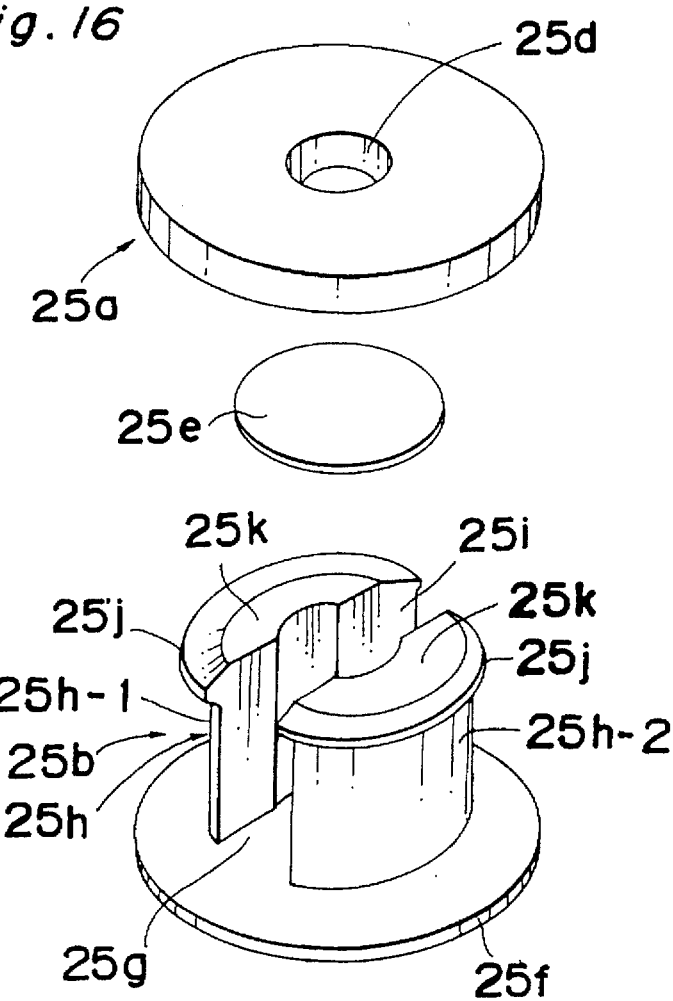
FIG. 16 is a perspective exploded view of a button-type valve.

FIG. 15 shows an enlarged section of the valve part shown in FIG. 14. Further, FIG. 16 shows a disassembled state of the button-shaped valve 25. This valve 25, generally, comprises a flange-like cap 25a and a valve body 25b, which are mutually engaged, and a rubber-made, disk-like, elastic valve member 25e. The valve body 25b comprises a bottom wall 25g having a flange 25f around its periphery and a cylindrical leg 25h standing thereon. At the top of the cylindrical leg 25h is formed a flange 25j. The cylindrical leg 25h is vertically split into two parts by a groove 25i so as to form two divisional legs 25h-1 and 25h-2. This groove 25i constitutes an air path. The top face of the cylindrical leg 25 constitutes a valve seat 25k for the valve member 25e.

On the other hand, the cap 25a has a recess 25s for receiving the top part of the valve body 25b, and an air infusion port 25d passing through a central part thereof.

Now, the valve 25 is mounted to the air bag body A in the following manner. Firstly, a moderate size opening 18b is made through the central part of the air infusion chamber 18a. Next, the top of the leg 25h of the valve body 25b is projected upward through the opening 18b from underneath. Subsequently, the valve member 25e is placed on the valve seat 25k of the leg 25h, and the cap 25a is put thereon. At this time, the flange 25j at the top of the leg 25h is airtightly engaged with the recess 25s of the cap 25a, and simultaneously, a circumference of the valve member 25e is strongly held between the valve seat 25k and the inner surface of the recess of the cap 25a. In other words, the communication between the opening 25d of the cap 25a and the chamber beneath the valve member 25e is shut off. Between the bottom face of the cap 25a and the surface of the first sheet S1 of the air bag A, and between the top face of the flange 25f and the surface of the second sheet S2, adhesive 25c, i.e. ring-like adhesive tapes, are placed to bond airtightly.

In the air bag furnished with the button-shaped valve 25 having the above construction, when air is supplied under pressure from the air infusion port 25d, a portion facing the groove 25i of the valve member 25e is extended inside and bent as shown by an alternate dot and dash line in FIG. 15. At this moment, the air sent under pressure leaks toward the groove 25i as shown by an arrow, and the air goes into the air chamber formed between the sheets S1 and S2, i.e. the air infusion chamber 18a. The infused air is sent to many other air chambers through the air infusion passage 15.

If a heat-sealable layer is formed on each surface of the sheets S1 and S2 with advance in the button-shaped valve 25 of the above construction, the adhesive tape 25c is unnecessary, and the valve 25 can be easily mounted on the air bag body A.

The above button-shaped valve has the advantage of making any difficult work such as peeling off a part of the releasing layer unnecessary, unlike the foregoing embodiment.

Figure 17:
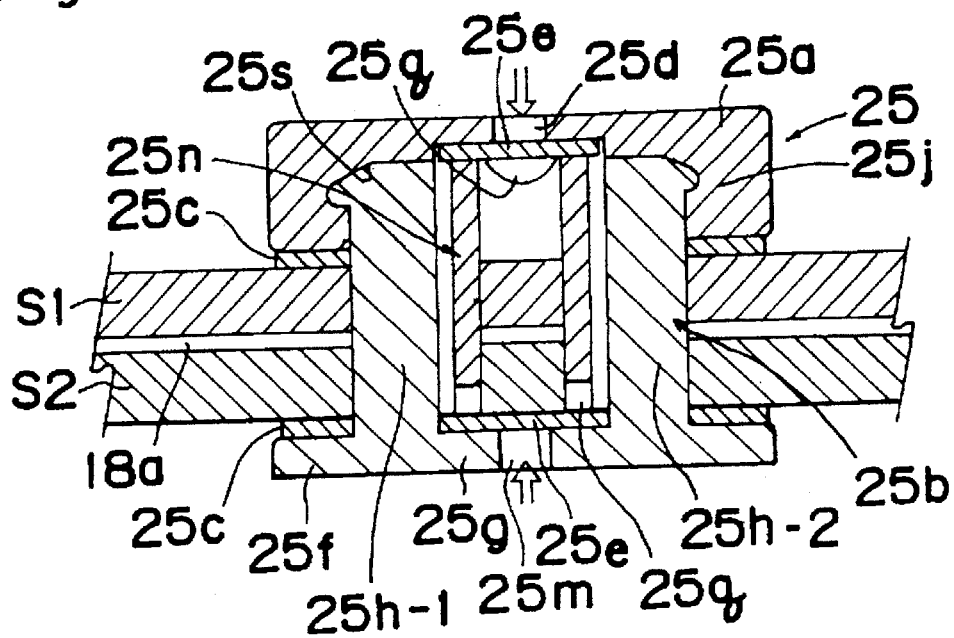
FIG. 17 is an enlarged sectional view showing a modified embodiment of FIG. 15.

According to the above construction, the air infusion port is provided only in a single spot (25d). However, in a case of providing two air infusion ports, the valve may be formed into a vertically symmetric structure. That is, it may be so designed that, in place of the flanged bottom wall, a flanged leg top part is formed, and both the top and the bottom parts are covered with caps. Alternatively, a modification as shown in FIGS. 17 and 18 may be adopted.

The basic structure of the button-shaped valve according to this modification is the same as that shown in FIGS. 15 and 16, and the parts having the same functions as those of FIGS. 15 and 16 are shown by the same reference numerals. This modification is characterized by two air infusion ports being provided on the upper and lower portions thereof. In this case, one air infusion port is provided in the cap 25a as described in the above embodiment, and the other air infusion port 25m is provided at a center of a bottom wall 25g of a valve body 25b. Between a pair of split legs 25h-1 and 25h-2, a seat member 25n is provided, and on the upper and lower parts of the member 25n, a pair of valve members 25e are provided.

Figure 18:
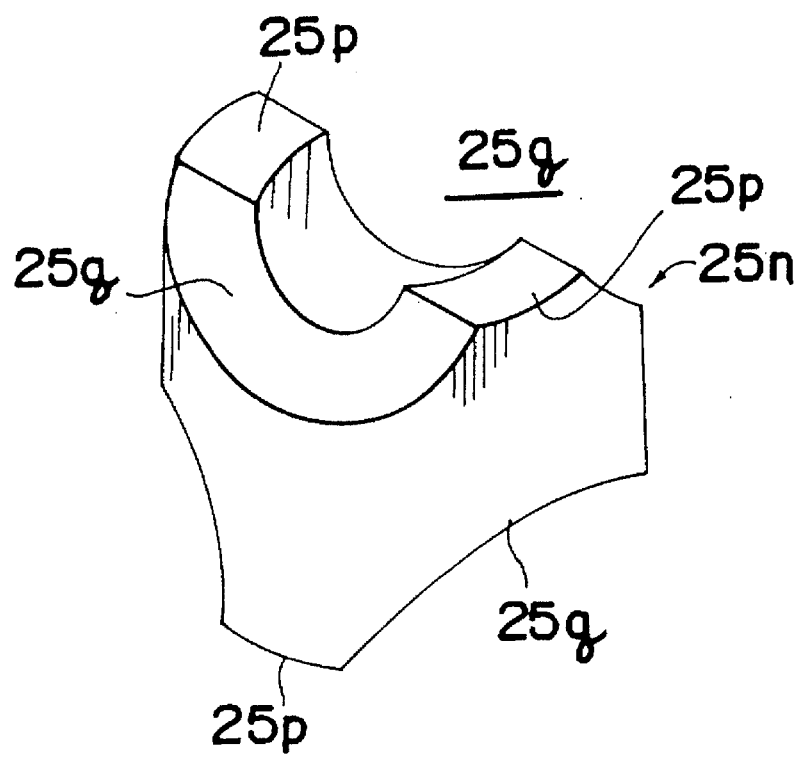
FIG. 18 is an enlarged perspective view of a seat member of FIG. 17.

The shape of the seat member 25n is shown well in FIG. 18. As shown in the drawing, the seat member 25n is cylindrical, and its upper and lower end portions, respectively, have a pair of notched air passages 25q facing in diametrical directions. And, the upper and lower air passages are differentiated in phase by 90 degrees. These passages 25q have the same function as the groove 25i of the foregoing embodiment. As shown in FIG. 17, in the state that the cap 25a is fitted on top of the leg 25h of the valve body 25b, the upper valve member 25e is strongly held between the upper face of the seat member 25n and the inner face of the recess 25s of the cap 25a, while the lower valve member 25e is strongly held between the lower face of the seat member 25n and the inner face of the bottom wall 25g, by which the chamber within the leg 25 is kept airtight with each valve member 25e forming a border.

In the modified embodiment with the above construction, when air is sent in under pressure from the upper air infusion port 25d, in the same manner as in the foregoing embodiment, the valve member 25e is partially bent so as to drop into the passage 25q. As a result, after the pressurized, fed air is guided into the groove between the split legs 25h-1 and 25h-2, the air is led to the air chamber 18a between the first and second sheets S1 and S2 of the air bag body A. On the other hand, in the case where air is forced from the lower air infusion port 25m, the valve works in a similar way as above. In this case, the air which is introduced into the leg 25h is first led between the inner circumferential surface of the leg 25h and the outer circumferential surface of the sheet member 25n, and then led into the groove 25i.

Figure 19:
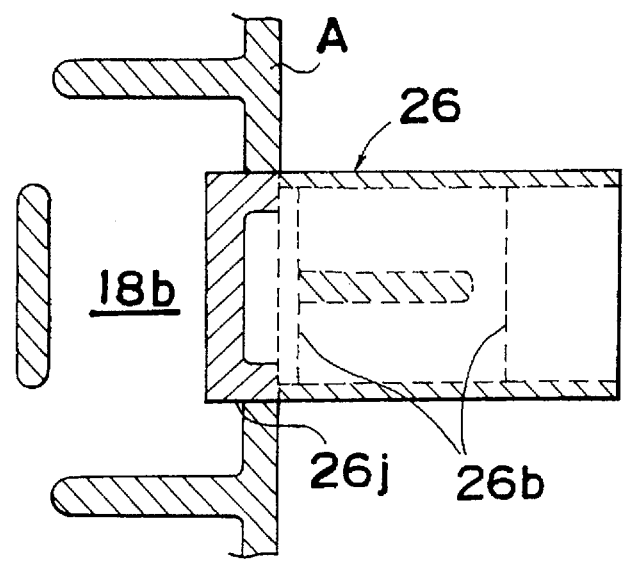
FIG. 19 is an enlarged plan view of an essential part showing a state in which a film valve according to another modified embodiment is applied to an air bag body.
Figure 21:
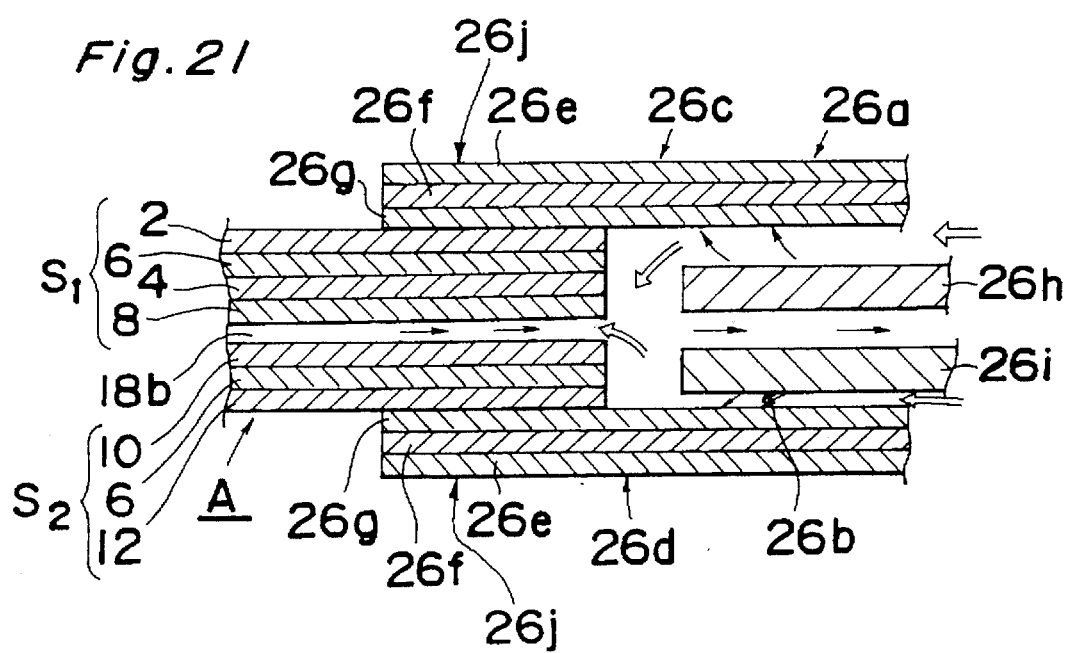
FIG. 21 is an enlarged sectional view of an essential part of FIG. 19.

Further, a modification of a film valve 26 is shown in FIGS. 19 to 21. This film valve, showing an improvement of the one shown in FIGS. 1 and 2, is made so that the film valve 26 is mounted externally to the air bag body. In the embodiment of FIGS. 1 and 2, as explained above, it is necessary to peel off a part of the releasing layer 8 in bonding the film valve 14 to the sheets S1 and S2. The work is, however, fairly troublesome. The modification as shown in FIGS. 19 to 21 eliminates this problem.

The film valve 26 comprises a bag-like valve body 26a and a valve member 26b housed in it. The valve body 26a is formed of a pair of front and back films 26c and 26d. As shown in FIG. 21, these front and back films 26c and 26d are made up of a laminate comprising a base film 26e, an anchor coat layer 26f, and a heat-sealing bonding layer 26g. On the other hand, the valve member 26b is formed by bending a sheet of film in a V-shape and bonding its two sides mutually. As shown in the drawing, the valve member 26b, being so disposed that its bent part is directed to the side of an air infusion port 26k of the valve body, is sandwiched between the two sheets of films 26c and 26d, and the two sides thereof are bonded to the films 26c and 26d. Further, at the central part, the upper piece 26h of the valve member 26b is bonded to the front film 26c, and the lower piece 26i of the valve member 26b to the back film 26d. Their bonding spots are shown by shading in the drawing. Each tip of the front and back films 26c and 26d extends in front of the tip of both pieces 26h and 26i of the valve member so as to constitute tongue pieces 26j that are separate from each other. In the valve with this constitution, when air is sent under pressure from the air infusion port 26k having a construction made by the outer ends of the two sheets of the front and back films 26c and 26d, the air passes through a space between the upper piece 26h of the valve member 26b and the front film 26c and also passes through a space between the lower piece 26i of the valve member 26b and the back film 26d, and the air is sent forward. On other hand, with respect to the air flow in the reverse direction, because the tip sides of the upper and lower pieces 26h and 26i of the valve member 26*b* are respectively brought into close contact with the front and back films 26*c* and 26*d*, any flow of air in the reverse direction is prevented.

The film valve with the abovementioned construction is externally mounted on one of the air chambers 18*b* at the periphery of the air bag A. In other words, this valve is fitted to the sheets S1 and S2 by heat-sealing a pair of tongues 26*j* to the surfaces of the sheets S1 and S2. Accordingly, the releasing layer 8 in the periphery of the air chamber 18*b* need not be peeled off, but is left unpeeled as shown in FIG. 21. In this case, as a part of the air chamber is composed of the releasing layer, even if heat is applied in fitting the film valve to it, the upper and lower sheets S1 and S2 are not mutually bonded.

According to the air bag having the film valve with the above construction, the pressurized air passed through the space between the front film 26*c* of the valve 26 and the upper piece 26*h* of the valve member 26*b* and passed through the space between the back film 26*d* and the lower piece 26*i* is introduced into the air chamber 18*b* of the air bag body A.

In the above construction, the surfaces of the front and back films 26*c* and 26*d* of the film valve are formed out of the heat sealing bonding layers. However, instead of this, even if the air bag body A of FIG. 7B, in which the surfaces of the air bag body A itself have heat sealable bonding layers, is used, the film valve can be easily mounted on the air bag body A by heat-sealing.

What is claimed is:

1. An air bag comprising:

a first sheet having an inner surface;

a second sheet having an inner surface; and a releasing layer, having a pattern corresponding to and defining an air chamber, printed on said inner surface of one of said first sheet and said second sheet;

wherein said first and second sheets comprise an extruded bonding layer bonding said inner surfaces of said first and said second sheets to each other, with said releasing layer between said inner surfaces, by heat fusion extruding lamination; and wherein said air chamber defined by said releasing layer is between said inner surfaces of said first and second sheets.

2. The air bag of claim 1, wherein said bonding layer is made of a polyethylene.

3. The air bag of claim 2, wherein at least one of said first and second sheets further comprises at least one layer selected from the group consisting of a picture pattern print layer and a vacuum metallizing deposition layer.

4. The air bag of claim 2, wherein said air chamber comprises a plurality of cellular air chambers communicating with each other.

5. The air bag of claim 4, and further comprising a valve extending through said first and second sheets in one of said plurality of cellular air chambers, wherein said valve is a check valve having an air infusion port for infusing air into the one of said plurality of cellular air chambers and a pair of upper and lower flanges positioned outside of said first and second sheets and bonded airtightly to outer surfaces of said first and second sheets.

6. The air bag of claim 5, wherein said valve comprises a valve body having a bottom with said lower flange thereon, a cylindrical leg extending through said first and second sheets, and a valve seat on top of said cylindrical leg, a cap having said upper flange thereon fitted to an upper end of said cylindrical leg, said cap having said air infusion port therein, and a disk-shaped elastic valve member sandwiched between said cap and said valve seat, and wherein said cylindrical leg of said valve body has an axial groove extending through said valve seat such that air infused from said air infusion port in said cap is led to the one of said cellular air chambers through said groove when said elastic valve member is pushed down into said groove.

7. The air bag of claim 5, wherein said valve comprises a valve body having a bottom wall with said lower flange thereon and said air infusion port therein and a cylindrical leg extending through said first and second sheets, said cylindrical leg having a groove therein, a cap fitted to an upper end of said cylindrical leg having said upper flange thereon and a second air infusion port therein, a seat member housed in said cylindrical leg having a valve seat at an upper end and a valve seat at a lower end, a first disk-shaped elastic valve member sandwiched between said cap and said valve seat at said upper end of said seat member and a second disk-shaped elastic valve member sandwiched between said bottom wall and said valve seat at said lower end of said seat member such that air infused from one of said air infusion ports is led to the one of said cellular air chambers through said groove when one of said elastic valve members is pushed down.

8. The air bag of claim 2, and further comprising an air infusion valve for communicating the exterior of said air bag with said air chamber.

9. The air bag of claim 8, wherein said air infusion valve comprises a film valve.

10. The air bag of claim 9, and further comprising a peripheral portion at which said first and second sheets have an opening formed therebetween communicating with said air chamber, said opening having a peripheral part, wherein said film valve is disposed in said opening, and wherein said film valve comprises a pair of films that are bonded to each other, said pair of films comprising outer ends bonded to respective ones of said first and second sheets at said peripheral part of said opening and inner ends maintained in a released state from said first and second sheets.

11. The air bag of claim 9, and further comprising a peripheral portion at which said first and second sheets have an opening formed therebetween communicating with said air chamber, said first and second sheets having respective outer surfaces, and wherein said air infusion valve comprises a valve body comprising a pair of front and back films each having a tongue piece, a valve member having a V-shape, said valve member comprising an open side and a bent portion, and an air infusion port, said valve member has sides bonded to respective ones of said front and back films so as to be held between said front and back films of said valve body and such that said bent portion faces toward said air infusion port, and each said tongue piece is bonded to a respective one of said outer surfaces of said first and second sheets at said opening of said air bag.

12. The air bag of claim 11, wherein each of said outer surfaces of said first and second sheets is provided with a heat-sealable layer to which a respective said tongue piece of said front and back films is bonded.

13. The air bag of claim 8, wherein said air infusion valve comprises an air infusion port communicating said air chamber with the exterior of said air bag and projecting externally of said air chamber and a plug for opening and closing said air infusion port.

14. The air bag of claim 2, and further comprising a peripheral part, wherein an air infusion port is formed between said first and second sheets at a predetermined position on said peripheral part, and wherein said air infusion port communicates with said air chamber through a winding and narrow air infusion passage that is filled with a viscous liquid.

15. The air bag of claim 1, wherein said first and second sheets each comprise a base film.

16. A method of making an air bag comprising the steps of:

printing a releasing layer having a pattern corresponding to a desired air chamber pattern on an inner surface of one of a first sheet member and a second sheet member; and bonding the first and second sheets to each other with the releasing layer sandwiched therebetween by heat fusion extruding lamination by extruding a bonding layer of one of the first and second sheets and laminating the first and second sheets.

17. The method of claim 16, wherein the one of the first and second sheet members is formed with the bonding layer on an inner surface thereof as a heat sealable bonding layer, the other of the first and second sheets is formed with a heat sealable bonding layer on an inner surface thereof, and said step of bonding further comprises heating the first and second sheets under pressure.

18. The method of claim 17, wherein the releasing layer is printed on one of the bonding layers.

19. The method of claim 16, wherein the releasing layer is printed on the bonding layer after it has been extruded.

20. An air bag made by the process of:

forming a first sheet having an inner surface;

forming a second sheet having an inner surface; and printing a releasing layer having a pattern corresponding to and defining a desired air chamber pattern on said inner surface of one of said first sheet and said second sheet;

wherein said steps of forming first and second sheets includes extruding a bonding layer on one of said first and second sheets; and bonding said inner surfaces of said first sheet and said second sheet to each other with said releasing layer between said inner surfaces by heat fusion extruding lamination, thereby forming an air chamber defined by said releasing layer between said inner surfaces of said first and second sheets.

* * * * *